(12) United States Patent
Zenker et al.

(10) Patent No.: US 9,371,969 B2
(45) Date of Patent: Jun. 21, 2016

(54) DISPLAY DEVICE

(75) Inventors: Thomas Zenker, Nieder-Olm (DE); Martin Taplan, Mainz (DE); Gerold Ohl, Sulzheim (DE); Silke Heinrich, Wiesbaden (DE)

(73) Assignee: SCHOTT AG, Mainz (DE)

( * ) Notice: Subject to any disclaimer, the term of this patent is extended or adjusted under 35 U.S.C. 154(b) by 97 days.

(21) Appl. No.: 14/119,910

(22) PCT Filed: May 4, 2012

(86) PCT No.: PCT/EP2012/058200
§ 371 (c)(1),
(2), (4) Date: Jan. 16, 2014

(87) PCT Pub. No.: WO2012/168012
PCT Pub. Date: Dec. 13, 2012

(65) Prior Publication Data
US 2014/0146538 A1   May 29, 2014

(30) Foreign Application Priority Data
Jun. 6, 2011 (DE) .......................... 10 2011 050 870

(51) Int. Cl.
*F21V 9/00* (2015.01)
*F21K 99/00* (2016.01)
*F24C 7/08* (2006.01)
*F24C 15/10* (2006.01)
*G02B 5/22* (2006.01)
(Continued)

(52) U.S. Cl.
CPC ... *F21K 9/56* (2013.01); *F21V 9/10* (2013.01); *F21V 33/0044* (2013.01); *F24C 7/082* (2013.01); *F24C 15/102* (2013.01); *G02B 5/223* (2013.01); *G02B 5/226* (2013.01); *G09F 9/33* (2013.01); *H05B 3/746* (2013.01); *H05B 6/1218* (2013.01)

(58) Field of Classification Search
CPC ..................................... F21K 9/56; F21K 9/50
USPC ......................................................... 362/293
See application file for complete search history.

(56) References Cited

U.S. PATENT DOCUMENTS 5,902,032 A * 5/1999 Hannigan et al. ............... 353/38
5,963,280 A * 10/1999 Okuda et al. ..................... 349/65
(Continued)

FOREIGN PATENT DOCUMENTS

DE   10052370.6 A1   5/2002
DE   10309225 A1    9/2004
(Continued)

OTHER PUBLICATIONS

International search report from corresponding International Application No. PCT/EP2012/058200 dated Dec. 13, 2012, 3 pages.
(Continued)

*Primary Examiner* — Evan Dzierzynski
(74) *Attorney, Agent, or Firm* — Ohlandt, Greeley, Ruggieor & Perle, LLP (57) ABSTRACT

A display device is provided that is a transparent, colored glass-ceramic with a front-side indication side, a rear-side illumination side, and at least one luminous element disposed in the region of the illumination side. The display device further includes a color compensation filter and a at least partially transparent intermediate layer between the color compensation filter and the glass-ceramic.

24 Claims, 6 Drawing Sheets

(51) Int. Cl.
*G09F 9/33* (2006.01)
*H05B 3/74* (2006.01)
*H05B 6/12* (2006.01)
*F21V 9/10* (2006.01)
*F21V 33/00* (2006.01)

(56) References Cited

U.S. PATENT DOCUMENTS

2002/0159261 A1* 10/2002 Hildenbrand et al. ........ 362/341
2005/0252754 A1   11/2005 Arnold
2007/0108184 A1    5/2007 Imamoto et al.
2008/0180016 A1*  7/2008 Oishi et al. .................... 313/112
2010/0193496 A1*  8/2010 Jung et al. ..................... 219/209
2011/0051412 A1*  3/2011 Jeong et al. ................... 362/235

FOREIGN PATENT DOCUMENTS

| | | |
|---|---|---|
| DE | 102008012602 A1 | 9/2009 |
| DE | 102009013127.2 A1 | 9/2010 |
| DE | 202010014361 A1 | 12/2010 |
| DE | 102010061123.9 A1 | 6/2012 |
| EP | 1429366 A1 | 6/2004 |
| EP | 2048781 A1 | 4/2009 |
| JP | 2005093209 A | 4/2005 |

OTHER PUBLICATIONS

Written Opinion of the International Search Authority dated Jun. 12, 2013.

* cited by examiner

DISPLAY DEVICE

CROSS REFERENCE TO RELATED APPLICATIONS

This application is a U.S. National Stage Entry under 35 U.S.C. §371 of PCT/EP2012/058200, filed on May 4, 2012, which claims benefit under 35 U.S.C. §119(a) of German Patent Application No. 10 2011 050 870.8, filed Jun. 6, 2011, the entire contents of both of which are incorporated herein by reference

BACKGROUND OF THE INVENTION

In order to improve user experience, modern glass-ceramic cooktops are equipped with signal lamps or 7-segment displays. Here, the cooking surface itself is composed of a transparent, colored glass-ceramic panel (substrate), which usually appears black in top view. The signal lamps provide the user with information concerning the ON status of the cooktop or individual cooking zones, the control setting and also whether the cooking zone is still hot after it is turned OFF. LED lamps are usually employed as lighting means.

Based on the coloring of the glass-ceramic cooktop and the very limited selection of colored LED displays, the range of colors that are available for user information is very greatly limited. These displays are by default red or perhaps orange, which is also based on the coloring of the glass-ceramic cooktop. In DE 100 52 370.6, the transmission curve is described for a glass-ceramic cooktop that also permits, in particular, a transmittance for blue light at approximately 450 nm and thus an expanded capability for color display. In DE 10 2009 013 127.2, different display possibilities based on these glass ceramic products are indicated. By broadening the transmission spectrum also to the blue wavelength region, the color possibilities for displays have in fact been expanded, but based on the small number of different-color LED displays, the number of colors visible to the user is also limited in the case of these glass-ceramic cooktops. A white LED, for example, would be perceived by the user as having a clear yellowish tinge due to the transmission curve of the cooktop. In DE 10 2010 061 123.9, it is proposed to avoid this deficiency by the use of RGB-LEDs. An LED lamp is thus composed of three LEDs in the primary colors of red, green and blue. Corresponding to the transmission of the glass-ceramic cooktop, the intensity of the 3 color LEDs is adjusted so that a white color effect for the light signal is perceived overall by the observer. This technology requires three LEDs and the controls belonging to them. Color shifts may occur over long periods of use due to the different aging of the LEDs of different colors.

SUMMARY

The object of the invention is thus to create an inexpensive and robust display device with transparent, colored glass ceramics, in order to provide any desired and pre-definable color effects for the user.

DETAILED DESCRIPTION

The object is achieved in that a color compensation filter is disposed between the glass ceramics and the light-emitting element, and in that a transparent intermediate layer is disposed between the color compensation filter and the glass ceramics. The displacement of the color coordinates of the lighting means is corrected to the desired color coordinates by the filter properties of the glass ceramics by combining the glass ceramics with such a compensation filter. The transparent intermediate layer makes possible the optical and/or mechanical coupling of the color compensation filter to the glass ceramics. In this way, the intermediate layer can be designed in such a way that it compensates for the geometrically uneven places of the glass ceramics that lead to optical scattering of the light emitted from the light-emitting element. In addition, the intermediate layer, alternatively or additionally, may also form a coupling element, or have such a coupling element, in order to join the color compensation filter with the glass ceramics. In this way, the intermediate layer may be fully transparent to the light of the light-emitting element, or it may also be partially transparent, for example colored, in order to also assume filter functions. Uncolored intermediate layers having a transmission of a min. 80% have proven advantageous in promoting a high luminosity on the display side. If the intermediate layer is used as a connection element, which connects the color compensation filter directly or indirectly to the glass ceramics, then, for example, it may be provided that the intermediate layer has an adhesive layer facing the glass ceramics and/or the color compensation filter. A simple coupling to the underside of the glass ceramics or to the side of the compensation filter facing the glass ceramics can be produced by these adhesive layers. It is particularly preferred that the intermediate layer is an adhesive tape, which can be obtained, for example, as a standard commercial item. A double-sided adhesive tape can be provided, in particular.

Alternatively, the intermediate layer may also be an adhesive. It may be, for example, a silicone adhesive, a polyurethane resin adhesive, an epoxy adhesive, a polyamide or polyimide adhesive, and/or a mixture of adhesives of these materials, or the like. A flat connection between the glass ceramics and the color compensation filter can be produced in a simple way with such an adhesive. The adhesive may be fully transparent, so that it does not influence the passage of the light emitted by the light-emitting element. It is also conceivable, however, that the adhesive is colored, so that by itself it assumes filter properties. It then also forms another filter element in addition to the color compensation filter.

A particularly preferred variant of the invention is configured so that the intermediate layer has the same refractive index as the glass ceramics, with a deviation of ±20%. With such a configuration, the intermediate layer can be used in order to equilibrate uneven places of the underside of the glass ceramics. The color compensation filter can then be introduced as a flat surface onto the intermediate layer, facing away from the glass ceramics. In this way, the uneven places of the underside of the glass ceramics then do not essentially influence the passage of light. With a deviation in the refractive index of the glass ceramics from that of the intermediate layer in the range of ±10%, the passage of light has only such a slight influence that it is not sensed as disturbing on the front side in the region of the display side.

In order to increase the functionality of the display device according to the invention, it may be provided that the color compensation filter and/or the intermediate layer bears one or more layer elements. These layer elements may be, for example, maskings, grids, operating symbols or the like. The layer elements may be present as separate components, for example, foils or films, or they can be printed on, lasered, etched, sprayed or sputtered on, and the like. The layer elements can be executed as non-transparent to light, for example, so that in the case of backlighting with the light-emitting element, these layer elements block the passage of light, which leads to the corresponding optical patterns on the front side in the region of the display side. It is also conceivable to configure the layer elements as partially transparent, so that they also filter out certain wavelength regions of the visible region in the form of a filter. Another color effect is then produced by this on the display side in the region of the layer elements.

The layer elements, for example, can be introduced on the side of the color compensation filter facing away from the intermediate layer. Therefore, the layer elements can be protected from mechanical stress and damage in a simple way.

The color compensation filter can be designed as a foil or film, a matte, panel or similar flat-surface elements. Flat-surface light effects can be produced correspondingly with such elements. The flat-surface element used for the color compensation filter can be coated with a color layer, in particular a color (paint, ink) application, or a colored flat-surface element. It is also conceivable that the flat-surface element is tinted. Such flat-surface elements can be produced in a simple way. For example, color compensation filters can be obtained inexpensively as standard components in the form of foils or films.

The intermediate layer can be configured as a complete flat-surface application between the color compensation filter and the glass ceramics, or it is conceivable that the intermediate layer is formed by individual partial layer elements, in particular, punctiform, stripe-form or grid-like elements. With such a configuration, material expansions, for example, in the form of temperature fluctuations, can be equilibrated.

The glass ceramics are preferably designed as smooth, untextured surfaces in the region of their illumination side, so that interfering light refractions are avoided in this way.

Another customizing of function then can be achieved for a display device according to the invention, if it is provided that the intermediate layer and/or the color compensation filter and/or the glass ceramics has one or more mounting or retaining parts, or the like, in the region of its illumination side. For example, it can be provided that the mounting or retaining parts, or the like can hold the color compensation filter, so that the filter is coupled to the glass ceramics indirectly via the retaining parts. The retaining parts can also be configured so that electrical components, such as, for example, the light-emitting element, printed circuit boards, sensors, switches, or the like, can be coupled.

Another display device according to the invention can be configured so that the color compensation filter and/or the intermediate layer and/or another intermediate layer disposed between the light-emitting element and the glass ceramics is provided with electrically conductive tracks. In this case, the additional intermediate layer should preferably also be at least partially transparent. The electrically conductive tracks may be used for the control and/or evaluation of electrical, electromagnetic, capacitive, inductive, or optical signals. For example, the conductive tracks can be used for the coupling of touch sensors, touch fields, electrodes, movement sensors, pot sensors, liquid sensors, antennas, image screens, displays, or the like. The conductive tracks can be introduced, for example, in such a way that they form a fine structure that is not visible or barely visible to the human eye, or form semi-transparent metal surfaces in the visible wavelength region.

A conceivable variant of the invention is configured so that the mounting or retaining parts, or the like hold the color compensation filter and/or an electrical component, for example, the light-emitting element, a printed circuit board, a sensor, or the like. Simple surface spotlights can be produced in this way.

The total transmission of the substrate $\tau_{tot}(\lambda)$ combines the transmission of the glass ceramics $\tau_{gc}(\lambda)$ and that of the compensation filter $\tau_{cf}(\lambda)$ (Eq.1). The intensity distribution $i_{LE}(\lambda)$ of the light-emitting element, which an observer perceives on the display side, is shifted to the intensity distribution $i_d(\lambda)$ of the display via the total transmission spectrum $\tau_{tot}(\lambda)$ (Eq. 2).

$$\tau_{tot}(\lambda)=\tau_{cf}(\lambda)\cdot\tau_d(\lambda) \qquad \text{Eq. 1}$$

$$i_d(\lambda)=\tau_{tot}(\lambda)\cdot i_{LE}(\lambda) \qquad \text{Eq. 2}$$

The accompanying shift of the color coordinates can be represented in the CIE standard colorimetric system CIExyY (CIE—Commision internationale de l'éclaireage [International Commission on Illumination]). (For the following description and examples thereof, the CIExyY 1931 version with a 2nd observer will be used in this document.) The human eye is not a spectrally continuous light sensor, but is made up of color receptors for limited red, green and blue spectral regions. Corresponding to this is the sensory perception of the L, M, S cones, with sensitivities in the red, green and blue light spectrum. Based on a test series with test subjects, tristimulus functions $\bar{x}, \bar{y}, \bar{z}$ and the integrals X, Y, Z thereof, which can reproduce the entire color space that our eyes can sense as a triplet of combinations of the artificial primary colors, were defined in the CIE formalism. Here, the $\bar{x}$ and $\bar{z}$ functions correspond only approximately to the L and S cone sensitivities. The $\bar{y}$ function is constructed so that it reproduces the brightness sensitivity in daylight and corresponds roughly to the M cone sensitivity. With Eq. 3 and Eq. 4, the perceived color coordinates are clearly described hereby by the standardized values of x and y; Y is a measure for brightness. The CIExyY formalism describes self-luminators, optionally illuminated through absorbing media, whose light spectrum that falls on the eye is transformed into the standardized X, Y, Z CIE coordinates, which then describe the color coordinates and the brightness of the self-luminator.

$$A = \frac{1}{N} \int \overline{a}(\lambda) \cdot \tau(\lambda) \cdot i(\lambda) \cdot d\lambda \qquad \text{Eq. 3}$$

with $$A = X, Y, Z$$

and $$\overline{a} = \overline{x}, \overline{y}, \overline{z}$$

with $$N = \int \overline{y}(\lambda) \cdot i(\lambda) \cdot d\lambda$$

$$x = \frac{X}{S}, \qquad \text{Eq. 4}$$

$$y = \frac{Y}{S},$$

$$z = 1 - x - y$$

with $$S = X + Y + Z$$

Figure 1:
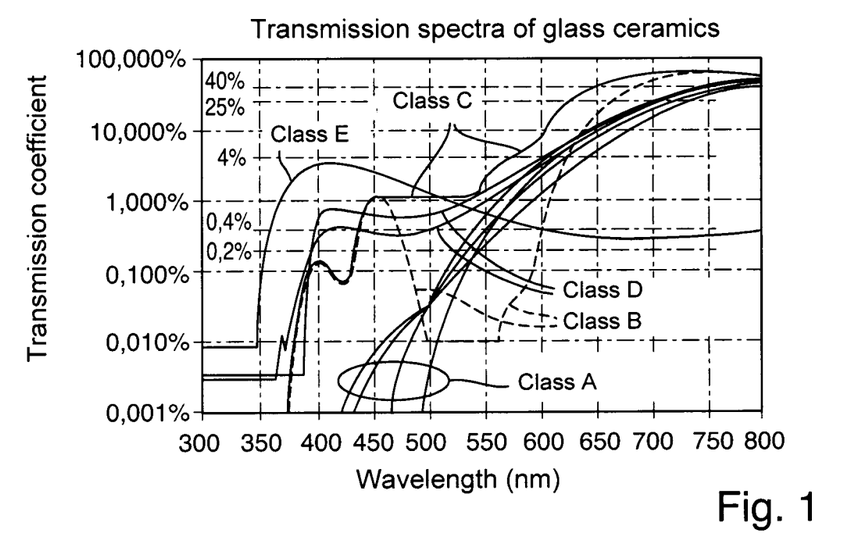
FIG. 1 illustrates typical transmission spectra of different types (classes) of glass ceramics that are usually used for cooking surfaces.

Minimum transmission values of the substrate in the spectral region of all three L, M, S cones or all three $\underline{x},\underline{y},\underline{z}$ CIE primary spectra are a prerequisite for obtaining desired display color coordinates in the red to blue spectral region for an observer by means of a compensation filter and preferably by means of a common commercial, cost-favorable display lighting element. Typical transmission spectra of different types (classes) of glass ceramics that are usually used for cooking surfaces are shown in FIG. 1. The latter involve the glass ceramics of type A colored with vanadium (V), which are the most widely used at the present time (for example, CERAN SUPREMA®, CERAN HIGHTRANS®, Kera-Black®); glass ceramics with coloring by Co, Fe, Ni (type B, for example CERAN COLOR®), with coloring by V, As and Fe (type C, China), with coloring by V, Fe (type D, for example CERAN HIGHTRANS eco®, and those with coloring by $Ti^{3+}$ by means of reducing refining (for example ZnS refining), type E.

Figure 2:
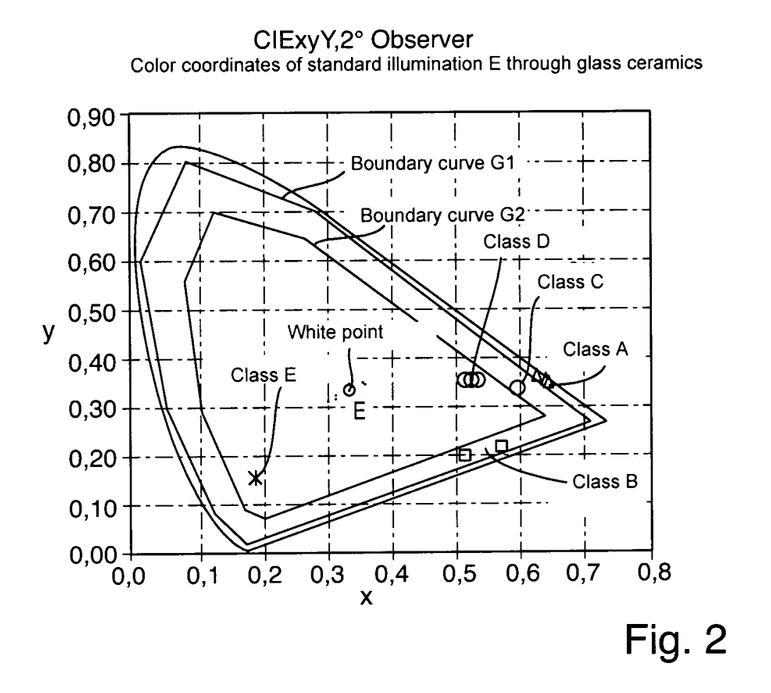
FIG. 2 illustrates the transmission differences in the three spectral sensory regions.

In order to elicit sufficiently bright color effects in the blue to red spectral region with common commercial lighting means (for example, LEDs) through the glass ceramics onto the display face, glass ceramics are necessary that have an average transmission of >0.2%, preferably of >0.4%, for each of the spectral regions of 420-500 nm, 500-620 nm and 550-640 nm. As can be understood from FIG. 1, the newer glass-ceramic classes D and E, and also class C with limitations, fulfill this condition. The current, widely used glass-ceramic class A does not fulfill this condition. Shifts in color coordinates according to the invention over the entire visible spectral region are also impossible with these glass ceramics using conventional lighting means and filters; in particular, there is no white compensation. On the other hand, the spectral transmission must not be too high in order that a view into the internal structure of the cooktop is prevented without employing additional aids, such as light-tight bottom coatings, and so as to present an esthetically preferred, non-transparent cooking surface that is uniform in color. We define this maximum transmission at <40%, preferably <25% at 400 nm and 700 nm, and additionally an average of <4% between 450 and 600 nm. As can be understood from FIG. 1, all of the glass-ceramic classes indicated, except for class C, which appears too transparent in practice, fulfill this second condition of preventing a view into the inner workings of a cooktop. Another, third condition results from the feasibility of a color shift to a white color perception of a commercially available lighting means through a glass-ceramic cooktop and a not-too-complex compensation filter. For this, the transmission differences in the three spectral sensory regions should not be too great. This is shown in FIG. 2. The color coordinates of standard illumination through glass ceramics according to the invention should lie within a boundary curve G1, preferably a boundary curve G2. The corner coordinates of the boundary curves G1 and G2 are listed in Table 2.

If an observer perceives a light stimulus, which is composed of two light signals that lie spatially next to one another but do not appear spatially resolvable by eye, and which are described by the intensity distribution of the light-emitting elements and by filter transmissions, then the perceived sensory stimulus is added linearly (Eq. 5), and the summed-up color coordinates (x, y) in the CIExyY chromaticity diagram lie on a straight line between the color coordinates $(x_1, y_1)$ and $(x_2, Y_2)$ of the two light signals (Eq. 6). In the special case of equal intensities (Eq. 7), (x, y) lies in the middle between the color coordinates of the two light signals (Eq. 8).

$$A = \frac{1}{N} \int \overline{a}(\lambda) \cdot (\tau_1(\lambda) \cdot i_1(\lambda) + \tau_2(\lambda) \cdot i_2(\lambda)) .. d\lambda = \qquad \text{Eq. 5}$$

$$A_1(\tau_1, k_1 i) + A_1(\tau_2, k_2 i)$$

with $$i_1 = k_1 \cdot i,$$
$$i_2 = k_2 \cdot i,$$
$$k_1 + k_2 = 1$$

$$x = k_1 x_1 + k_2 x_2 \qquad \text{Eq. 6}$$

with $x_i = f(\tau_i, i)$, y,z correspondingly.

$$k_1 = k_2 = 1/2 \qquad \text{Eq. 7}$$

$$x = \frac{x_1 + x_2}{2}, \qquad \text{Eq. 8}$$

$$y = \frac{y_1 + y_2}{2},$$

$$z = \frac{z_1 + z_2}{2} = 1 - x - y.$$

This linear relation is also known from color diagrams, for example, for image displays such as CRT or LCD monitors, in which possibly perceptible color coordinates in the CIExyY diagram lie in a triangle between the color coordinates of the three primary colors of the display device, usually an RGB color space, or in a color polygon with more than three primary colors. Here, the color coordinates are calculated from the linear combination of three or more primary intensities according to (Eq. 6).

In the application according to the invention of two filters disposed one behind the other, of a substrate (for example, glass ceramics) and of a compensation filter, the relation is no longer linear, as is clarified by Eq. 9 in comparison to Eq. 5. In Eq. 9, for $\tau_1(\lambda)$ and $\tau_2(\lambda)$, for example, from Eq. 1, the transmission spectra of the glass ceramics $\tau_{gc}(\lambda)$ and of the compensation filter $\tau_{cf}(\lambda)$ can be employed.

$$A_{12} = \frac{1}{N} \int \overline{a}(\lambda) \cdot \tau_1(\lambda) \cdot \tau_2(\lambda) \cdot i(\lambda) .. d\lambda \qquad \text{Eq. 9}$$

Figure 3:
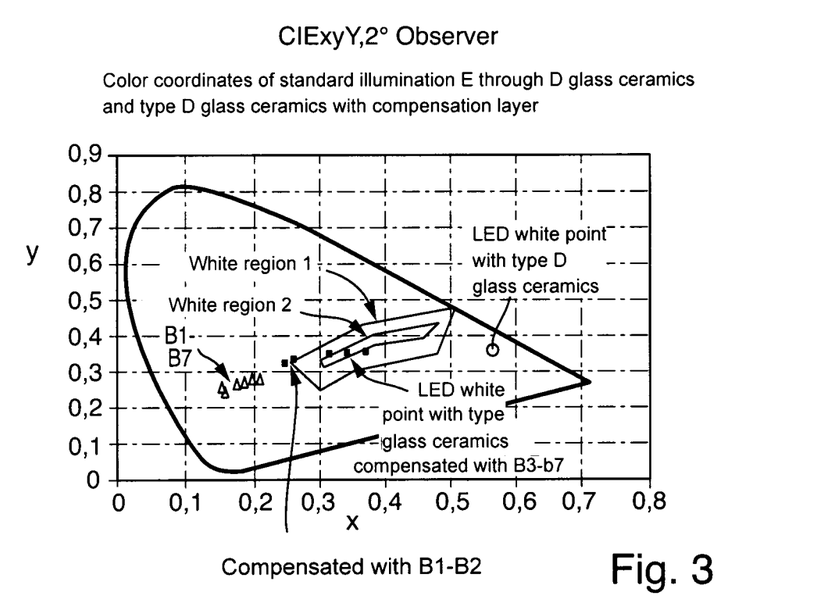
FIG. 3 illustrates the color coordinates of the standard light E, taken individually through type D glass ceramics and individually through different color filters B1-B7.

The color coordinates of the light-emitting element through the successively disposed filters no longer necessarily lie on a straight line between the color coordinates of the light-emitting element through the individual filters. Conversely, this leads to the phenomenon that the same common color coordinates, which are compensated according to the invention for a light-emitting element through glass ceramics, can be achieved with different compensation filters, whereby the color coordinates of the light-emitting element through the individual compensation filters need not be identical and depend on the spectral distribution in each case. In FIG. 3, the color coordinates of the standard light E, taken individually through type D glass ceramics and individually through different color filters B1-B7, which are disposed behind one another, each time in combination with the glass ceramics, can cause the standard light to appear at the same overall color coordinates. In the example shown, the color filters are constructed so that the overall color coordinates for the observer lie at the achromatic point E (gray or white point E).

With a compensation filter according to the invention, as described, it is thus possible to further compensate for the shift of the original color coordinates of the lighting means through the colored substrate, especially for white color coordinates. A further application according to the invention is to shift the color coordinates of the lighting means on the display side of the substrate to desired color coordinates that are different than the original color coordinates of the lighting means. The combined shift of the color coordinates through the substrate and the filter is not compensated here intentionally. In this case, on the one hand, one can produce color coordinates that cannot be shown, for example, by available fixed wavelengths of commercially available LEDs, for example, color coordinates that lie between those of a yellow LED and those of an orange LED. This is advantageous, e.g., for identifying, differentiating, and marketing of product lines. On the other hand, light-emitting elements can be constructed uniformly and thus with cost advantages using a variety of non-monochromatic, but spectrally widely emitting, colored lighting means (for example, white LEDs, fluorescent tubes). By application of different color filters according to the invention, different color coordinates can be produced for different product lines or the same color coordinates of a product line combined with differently colored substrates. Shifts of color coordinates and compensation are particularly applicable to spectrally broadband lighting means, such as white LEDs, fluorescent tubes, or mixed colors of combined single-color LEDs, for example RGB LEDs. Single-color, nearly monochromatic lighting means, for example, such as red, blue, and green LEDs used as single colors generally do not undergo notable shifts of color coordinates through filters.

According to the invention, to compensate the color coordinates of a lighting means so as to provide white does not mean to precisely hit upon the achromatic point E. Instead, the eye tolerates a wide range of color coordinates perceived as white. Among other things, this also depends on the color coordinates of the surrounding surfaces, such as a red-black cooktop surface. Preferably, it can thus be provided, for white compensation of any desired light-emitting element, to obtain color coordinates that preferably lie in the boundaries of the white region W1, and preferably of the white region W2. The white region W2 in this case encompasses the white fields defined in ANSI (ANSI binning) 1A, ..., 1D, ..., 8D, that are typically used by LED manufacturers in order to characterize the color coordinates of their white LEDs. This region corresponds to color temperatures of 2580 K to 7040 K (CCT, color correlated temperature), corresponding to a perceived white from warm white to cold white. The corner points of the white regions W1 and W2 in FIG. 3, which are defined according to the invention, are listed in Table 1. Of course, a white compensation can also be undertaken in a region outside the $W_1$ or $W_2$ regions. For example, a white compensation can also be undertaken up to 15,000 K (CCT, color correlated temperature) within the scope of the invention. The "cold white" region (between 10,000 K and 15,000 K) is perceived, of course, sometimes as "hard" by the user, partially from the light effect. Color temperatures down to 2000 K are conceivable; such light effects are perceived as having a yellow tinge.

According to the invention, the compensation of color coordinates is not limited to the example coatings 1-4 or the standard light source E. Preferably, commercially available and cost-effective lighting means, for example, white LEDs are used in an application. Lighting means of other colors, but not monochromatic, such as fluorescent tubes, for example, or, in addition, a combination, for example, of blue, green and red LEDs (RGB lighting means), which are adjusted to fixed color coordinates as backlighting of LCD displays, for example, or control a color representation of the display, can be employed in order to compensate the original color coordinates of the lighting means by means of appropriately constructed compensation filters on the display side of the cooktop or to specially produce a white color effect or also any other desired color effect.

According to the invention, the compensation of color coordinates is not limited to white color coordinates. Any desired color coordinates can be set with an appropriate compensation filter, for example, brand-specific colors for displays or company logos, or also different color coordinates for user-friendly differentiation of warnings, instructions or user assistance, or different color coordinates for different power levels in cooktops. This can find application in diverse examples, which provide an easier user management, status displays or different ambiences of decorative lighting.

Multicolor prints for generating multicolor lighting presentations or colored symbol representations are also conceivable.

Due to different coating methods, such as, e.g., screen printing, the color layer permits a sharp demarcation of the signal field and the screening out of scattered light, as well as a representation of signs, symbols or lettering, which are visible to the user when the illumination is turned ON and which is not perceptible to the user in the OFF status. Even the position of these markings/logos are not recognizable to the user in the OFF status, whereby the single-color elegant appearance of the glass-ceramic surface remains. This effect is designated the "dead front" effect and is often desired by designers, since the cooktop is clearly upgraded in total esthetics in this way. This "dead-front" effect is possible only with considerable additional expenditure, for example, in the case of transparent glass-ceramic cooktops known particularly in Japan. Based on the high transparency of these cooking surfaces, display indicators or lamps are visible directly or clearly, which is perceived partially as a disturbing effect. In contrast to these transparent cooking surfaces, the darkly colored cooking surfaces, in addition, can also be combined with powerful radiant heating units, whereupon with the proposed method, the glass-ceramic cooktops having radiant heating units or halogen heating units will be clearly upgraded in the user's experience.

It can be particularly provided within the scope of the invention that the color layer is applied as a color (paint, ink) application, particularly onto a transparent support; in particular, it is introduced onto a film or foil support, and/or is coated onto the glass ceramics, and/or the color layer is held between two transparent supports, in particular two film supports, and/or the color layer is formed from a support colored throughout its thickness, at least in regions, in particular a film or foil support. The transparent support or the support colored throughout, for example, can be composed of a film or foil material. With application in combination with glass ceramics as cooking surfaces, film materials of polyethersulfone (PES), polycarbonate (PC) or of polyethylene terephthalate (PET) are particularly suitable. These materials are sufficiently temperature-resistant. The use of a film or foil material has the advantage that these materials are inexpensively obtainable and, in addition, make possible a uniform flat-surface background of the glass ceramics. Thin glass sheets are also particularly suitable.

The image sharpness of fine lines and lettering on the top surface is possible without the optically disruptive distortions when glass-ceramic cooktops that are usually knobby or dimpled on the bottom are used, by applying a leveling layer, which is matched in its refractive index, on the dimpled surface. This is a further clear advantage when compared to the masking printed onto a dimpled bottom as described in U.S. Pat. No. 6,369,365. Distortions that are too greatly disruptive arise due to the direct printing of the dimpled bottom, so that only very large, coarse windows and symbols can be represented. The thickness of the cooktop usually amounts to 4 mm, but it also amounts to up to 6 mm in commercial applications. In order to increase the color intensity or brightness, it is also conceivable to use cooktops with a reduced thickness of 3 mm, for example.

In addition to the principal application field indicated here for lighting with individual LEDs or 7-segment displays, this system is also suitable, of course, for any other desired light source and form of presentation; for example, halogen lamps, light sticks, fiber optics or fluorescent tubes can be used also as a light source. In addition to light points or 7-segment displays, bar graphs or illuminated labels for identifying cooking zones or marking are also conceivable, as is also the illumination of larger cooking zone surfaces or borders. In addition, compensation of color coordinates or shifts according to the invention are also applicable to background lighting of alphanumeric or graphic displays, for example LCD displays. In addition to the preferred use in glass-ceramic cooktops, this system can also be used in the panel region of baking ovens or Domino cooking appliances, including grilling plates. For example, fireplace surrounds of glass ceramics are also known. An illumination with the proposed system for improvement of user comfort is also possible for these fireplace surrounds. The cooktop can be shaped as planar, curved, or it may have a complex shape. Gas burners, induction coils or radiant heating units or halogen heating units are conceivable as heating means for the cooking areas.

A corresponding transmission curve that results from the transmission curves of the substrate and of the color filter (color layer) is a deciding factor for the overall perception of the desired color. Since the transmission curve of the substrate is "predefined", the correction can only be effected via the color layer.

The correction filter effect of the color layers is determined by the respective transmission curve in the visible region via the following essential parameters:

Position of the transmission maximum
Width of the transmission maximum
Intensity of the transmission maximum The position and width of the transmission maximum is determined by the color composition, in particular by the color-rendering pigments. The intensity, in contrast, is determined by the layer thickness of the color and the concentration of the colorant or of the color pigment in the color matrix.

Figure 4:
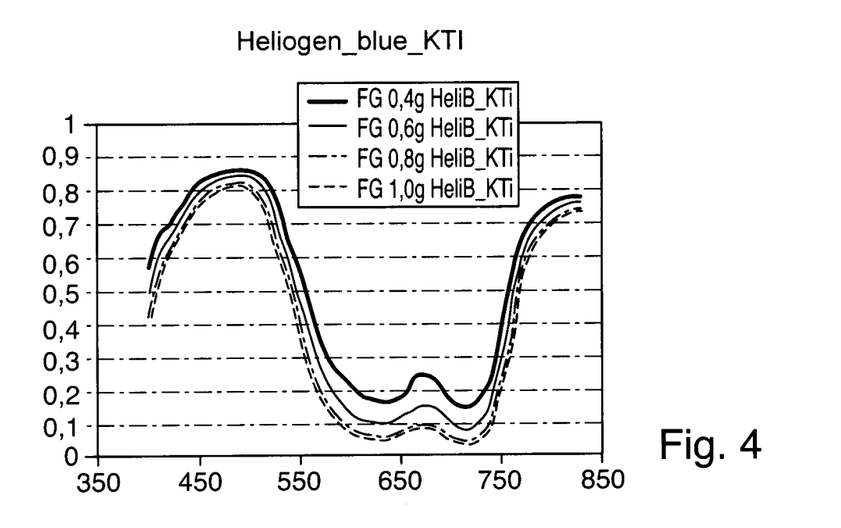
FIG. 4 illustrates different colorant concentrations are shown as a function of the transmission.
Figure 5:
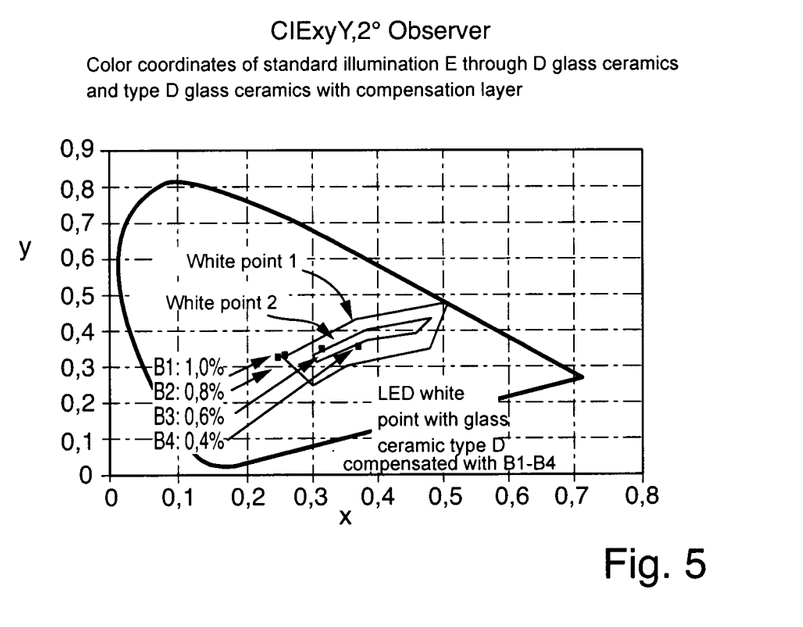
FIG. 5 illustrates different colorant concentrations are shown as a function of the color coordinates.

Thus, different colorant concentrations are shown in FIG. 4 and FIG. 5 as a function of the transmission (FIG. 4) and of the color coordinates (FIG. 5), wherein the spectra B1 to B4 are optimized for the compensation of the standard light source E for the glass-ceramic type D are shown in FIG. 4, and the concentration curves B1 to B4 are shown in FIG. 5. By means of a targeted selection of the colorant and/or pigment concentration, the color coordinates can be adjusted to the desired range.

The color layer containing 1% and 0.8% Heliogen blue (B1 or B2) lies at the edge of the white region W1. In contrast, B3 containing 0.6% Heliogen blue component in the color matrix lies at the upper end of the white region W2, and B4 containing 0.4% of the same blue colorant lies below W1. Due to the position of the points B1-B4 in the graph of the color coordinates (FIG. 5), it is shown that the desired color coordinates are possible due to a targeted adjustment of the pigment concentration. The colorant or pigment concentration in the finished baked color layer can be adapted to the respective substrate by means of the layer thickness and/or by the colorant and/or pigment concentration in the color matrix.

The color layer can be produced from different color systems. On the one hand, organic color systems, e.g., for low-temperature applications, and on the other hand, inorganic color systems for high-temperature applications, or mixtures of the same are suitable.

As stated above, the adapted transmission curve can be obtained by color layers that are composed of a color matrix and/or colorants and/or color pigments. As colorants/color pigments, organic and inorganic colorants and/or color pigments are used, preferably absorbing organic and inorganic colorants/color pigments; particularly preferred are blue, green and blue-green colorants/color pigments. Of the blue-green colorants/color pigments, those colorants/color pigments are preferred that have a transmission maximum in the region of 400-600 nm, and particularly preferred in the region of 450-550 nm. For example, iron-cyano complexes, indanthrone, indigo, copper phthalocyanines, preferably the β-form of copper phthalocyanines, chromium chelates, preferably $Cr^{3+}$ with ligands of the azo and azomethine series, e.g., Heliogen blue 23050, are used as colorants.

Used as color pigments are, for example, cobalt-tin oxide compounds (mixed oxides); aluminum silicates, preferably sulfur-containing aluminum silicates (e.g., ultramarine blue and green); zirconium silicates, preferably with vanadium additive, particularly preferably with 1.5% vanadium additive; zirconium silicate-vanadium oxides; calcium-copper silicates, preferably $CaCuSi_4O_{10}$; copper carbonate compounds, $2CuCO_3*Cu(OH)_2$; cobalt-aluminum-oxide compounds, preferably as cobalt aluminate (cobalt aluminum spinel; Color Index Blue 28); and cobalt-chromium oxide compounds, preferably as cobalt chromite (cobalt-chromium spinel; Color Index Blue 36).

These pigments are preferably used as nanoparticles. As a special embodiment, the named pigments can also be applied as scattered particles.

The color matrix may be composed of organic and/or inorganic components. The organic color matrix is composed of a binder, solvent, and additives such as curing agents, cross-linkers, flow-control agents, additives, anti-foaming agents, acidic and/or basic and/or cationic and/or anionic and/or radical polymerization initiators.

The following can be used as binders: rubber, polyurethane resins, silicones (organic and/or inorganic, cross-linking), sol-gel compounds, hybrid polymers, acrylate-based systems, preferably methacrylates, epoxides, polyamides, polyimide and mixtures of the same. These binders can be used with and without nanoparticles.

In particular, the coating composition can comprise sol-gel precursors of silicon, titanium, zirconium, aluminum, zinc, magnesium, calcium, tin or mixtures thereof. Most particularly preferred are the sol-gel precursors SiORxRy, TiORxXy, ZrORxXy, AlORxXy, ZnORxXy, MgORxXy, CaORxXy and SnORxXy.

In one embodiment, the particle size of the sol-gel precursors and/or the organometallic and/or inorganic nanoparticles is in a range of 0.05 to 200 nm, particularly preferred from 1 to 100 nm. The particle shape in this case can particularly be spherical as well as irregular, or also of chain form.

In a particularly preferred embodiment, the coating composition comprises a UV-curable and/or thermally curable hybrid-polymeric, hydrolyzed and condensed alkoxysilane precursor, in particular, glycidylpropyloxytriethoxysilane and/or methacryloxypropyloxytrimethoxysilane, which can be further functionalized with polysiloxanes. The sol-gel layer on the glass ceramics thus preferably comprises the reaction products of the sol-gel precursors described herein with the polysiloxanes described herein.

In a special embodiment according to the invention, the coating contains inorganic nanoparticles. The nanoparticles improve the scratch resistance of the coating, for example.

In this particular embodiment, inorganic nanoparticles are added to the coating solution. Preferably, the volume fraction of the nanoparticles in the coating composition amounts to more than 10% and, more preferably, to more than 20%. The nanoparticles are preferably added as an alcoholic dispersion.

Preferably, the coating composition also comprises nanoparticles in the form of amorphous or nanocrystalline metal oxides. Preferred metal oxides are silicon dioxide ($SiO_2$), titanium dioxide ($TiO_2$), zirconium dioxide ($ZrO_2$), $Y_2O_3$-stabilized zirconium oxide, alumina ($Al_2O_3$), zinc oxide (ZnO) and indium-tin oxide (ITO). Preferably, their hybrid polymeric derivatives or compounds may also be used. The metal oxides may be present in the form of particles and/or organometallic polymers.

For example, terpeniol, n-butyl acetate, carbitol, carbitol acetate, ethylene glycol monoethyl ether and mixtures of the same are used as solvents. In particular, a color matrix suitable for screen printing requires high-boiling solvents with a vapor pressure of <5 hPa, preferably of <2 hPa, and most particularly preferred of <1 hPa. Additionally, curing agents can be added, e.g., in order to increase the layer hardness/scratch resistance, for example nanoparticles, bis-epoxides. Depending on the coating method in each case, various flow-control agents may also be added, for example, PEG, BYK 302, BYK 306, in order to obtain homogeneous layer thicknesses.

The components of the color matrix and the colorants and/or color pigments are homogenized, preferably by means of a Dispermat (Ultra-Turax) or three-roll mill.

Different coating methods are applied: for example, printing methods, such as ink-jet printing, offset printing, pad printing, roll coating, preferably screen printing; dipping methods, spin coating, spraying methods. The viscosity of the color matrix must be adapted to the processability/printability for these coating methods; in particular, the thixotropic behavior must be adapted to the preferred screen printing method. Among others, cellulose compounds, polyvinylpyrrolidone, polyethylene glycol, block copolymers are used as organic thickeners; aerosils, flame-pyrolysis-produced or precipitation-produced SiOx or AlxOy particles are used as inorganic thickeners.

After coating, the color layers, for example, are thermally cured and/or UV-cured.

Homogeneous layer thicknesses are advantageous for the filtering effect of the color layers according to the invention, so that the fluctuations in the layer thickness are <3 µm, preferably <1 µm, and most particularly preferred <0.5 µm. Therefore, smooth surfaces are preferred on both sides. In this context, "smooth" means that the top and the bottom surfaces of the color compensation filter have approximately the same surface geometry and the bottom does not have the usual dimpled or knobby structure.

In particular, in the case of non-smooth surfaces, e.g., knobby or dimpled surfaces, a leveling layer, which is preferably matched in refractive index, can be applied directly onto the surface, this layer being composed of, for example, polyurethane resins, silicones (organic and/or inorganic, crosslinking), sol-gel compounds, hybrid polymers, acrylate-based systems, preferably methacrylates, epoxides, polyamides, polyimide, and mixtures of the same. This leveling layer can be used with and without nanoparticles. Then the already described color layer will be applied on this leveling layer.

According to another embodiment of the invention, it can be provided that the leveling layer joins the color layer to the glass ceramics indirectly or directly, in particular bonds it, or that the leveling layer joins a support with the color layer to the glass ceramics.

Embodiment Example 1

Dark Glass Ceramics with Knobby Bottom

Production Binder A 0.08 mole of GPTES (glycidyloxypropyltriethoxysilane) containing 0.02 mole of TEOS (tetraethoxysilane) is hydrolyzed with water mixed with 0.125 mole of para-toluic acid. Then the solvent is removed in a rotary evaporator and 22.6 g of binder are obtained.

Production Binder B 0.04 mole of MPTMS (methacryloxypropyltrimethoxysilane) containing 0.02 mole of TEOS (tetraethoxysilane) and 0.04 MTEOS (methyltriethoxysilane) is hydrolyzed with water mixed with 0.125 mole of para-toluic acid. Then the solvent is removed in a rotary evaporator.

A commercially available dispersion of 15-nm $SiO_2$ particles in diethylene glycol monopropyl ether is used as a nanoparticle-containing solution.

The initiator solution contains 50 mass % of heat-activatable initiator methylimidazole in ethylene glycol monopropyl ether.

A leveling layer having a layer thickness of less than 0.5 mm of polyurethane resin with a light-refraction index of 1.59 was printed onto knobby, dark glass ceramics of the type CERAN HIGHTRANS eco® by screen printing and then heat-cured. The fluctuations in layer thickness were <3 µm. A color, which was composed of the following components was printed onto this leveling layer by means of a screen-printing method.

32% binder A
60% nanoparticle-containing sol-gel solution
2% initiator solution
6% Blue 807 dye 94030

Drying was conducted for 3 min under UV radiation.

The fluctuations in layer thickness were <3 µm; the light of a white LED was displayed homogeneously white.

Embodiment Example 2

Dark Glass Ceramics with Knobby Bottom

A leveling layer of polyurethane resin was printed by screen printing on a knobby dark glass-ceramic product of the type CERAN HIGHTRANS eco® and then thermally cured. The fluctuations in layer thickness were <3 µm. A color was printed on this leveling layer by means of a screen-printing method, this color being composed of the following components:
32% binder B
60% nanoparticle-containing sol-gel solution
2% initiator solution
6% Blue 807 dye 94030

Drying was conducted for 3 min under IR radiation combined with convection.

The fluctuations in layer thickness were <3 µm; the light of a white LED was displayed homogeneously white.

The invention will be explained in further detail in the following on the basis of examples of embodiment shown in the drawings according to FIGS. 6 to 11. These drawings show the schematic structure of different display devices in lateral view.

Figure 6:
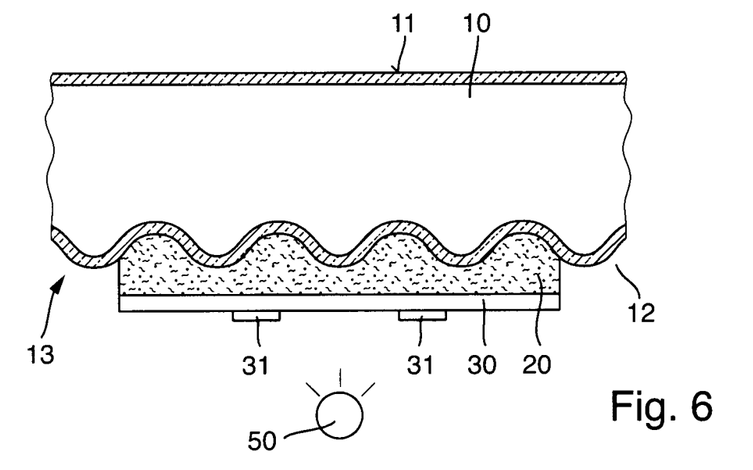
FIG. 6 illustrates a glass ceramic product.

FIG. 6 shows a glass ceramic product 10, which has a planar smooth top side as display face 11 and a back-side illumination face 12. The illumination face 12 is formed as textured. Therefore, it has a texturing 13, which is formed by knobby elevations as are common for glass-ceramic cooktops. In the region of illumination face 12, the texturing 13 is backed by means of a leveling layer, which is formed as intermediate layer 20. The intermediate layer 20 is formed, for example, by a fully transparent polyurethane resin. As can be seen in FIG. 6, the uneven places that are brought about by the texturing 13 are equilibrated by means of the intermediate layer 20, so that the intermediate layer 20, on its side not facing the texturing 13 forms a planar surface. The color compensation filter 30 is applied to this planar surface. In this case, the compensation filter 30 can be bonded to the intermediate layer 20. The color compensation filter 30 bears layer elements 31 facing away from the intermediate layer 20. These can be formed as maskings, grids, operating symbols or the like. They can be printed on or, for example, they can be introduced as a separate element, in particular as a foil or film. It is also conceivable that the layer elements 31 are applied by laser, etched, sprayed on or applied by sputtering. A light-emitting element 50 is disposed in the region behind the color compensation filter 30. The light emitted by the light-emitting element 50 passes through the color compensation filter 30, the intermediate layer 20, and the glass ceramics 10 on the display face 11. In the passage of light, due to the color compensation filter 20 and the colored glass ceramics 10, the light of the light-emitting element 50 is filtered in such a way that the desired light effect arises on the display face 11. It can also be additionally provided that the intermediate layer 20 is partially transparent and also acts as a filter element so as to influence the passage of light. The layer elements 31 can be designed as non-transparent to light, for example. In this way, light cannot pass through the glass ceramics 10 at these positions, so that an appropriately darker optical impression is achieved on the display face 11. For example, symbols, display elements or the like can be simply represented in this way.

Figure 7:
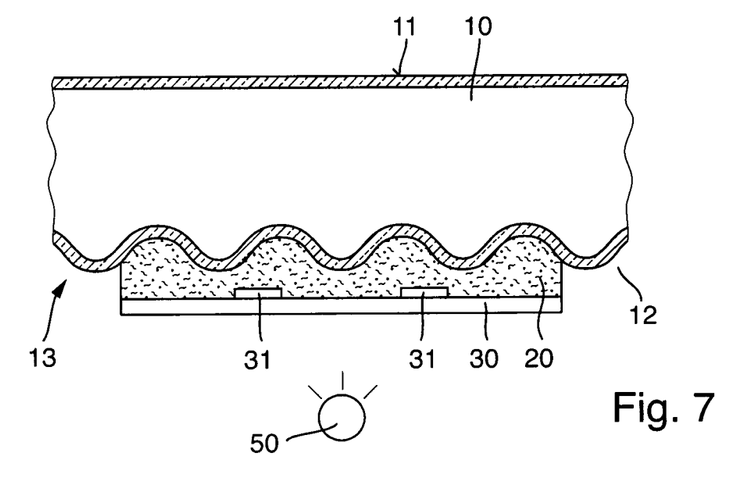
FIG. 7 illustrates a variant of the glass ceramic product of FIG. 6.

The embodiment variant according to FIG. 7 corresponds to that according to FIG. 6. Unlike FIG. 6, of course, the layer elements 31 are moved to the region between the intermediate layer 20 and the color compensation filter 30. In this way, they are protected from mechanical stress.

Figure 8:
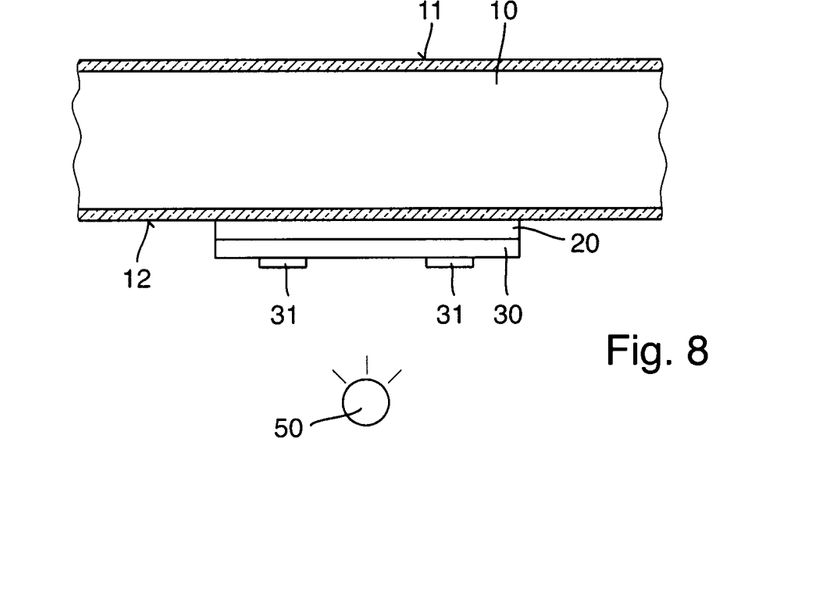
FIG. 8 illustrates another glass ceramic product.
Figure 9:
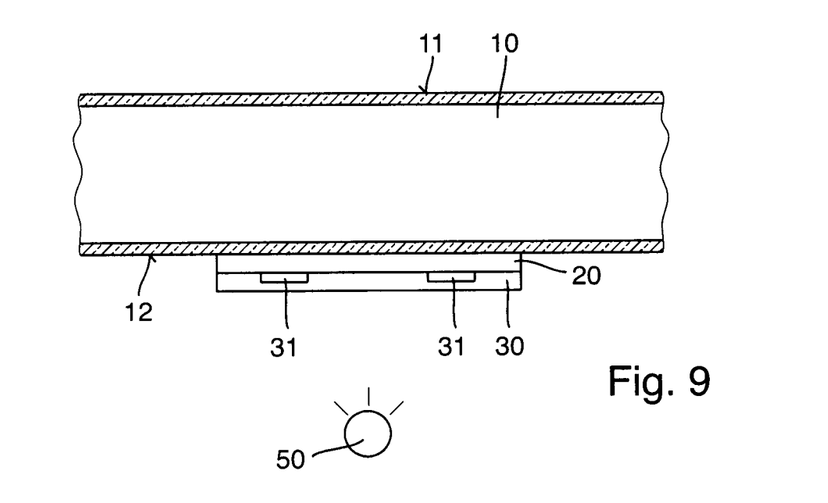
FIG. 9 illustrates another glass ceramic product.

FIG. 8 shows, in principle, the same construction of a display device as the illustration according to FIG. 6. Of course, in the present case, the glass ceramics 10 involve glass ceramics 10 which are smooth on both sides and which are formed planar both in the region of the display face 11 as well as in the region of the illumination face 12, so that two plane-parallel surfaces are provided for the glass ceramics 10. Therefore, the intermediate layer 20 does not need to equilibrate any surface irregularities and presently serves as the connection layer for the color compensation filter 30. In this case, the intermediate layer 20 can be embodied, for example, as adhesive (completely or partially transparent) or as adhesive tape. It has been shown that double-sided adhesive tapes have proven to be particularly suitable. These can be used both for coupling to the glass ceramics 10 as well as to the color compensation filter 30. In the example of embodiment according to FIG. 8, the layer elements 31 are arranged lying on the outside. The example of embodiment according to FIG. 9 differs from the example of embodiment according to FIG. 8 to the effect that the layer elements are again arranged between the color compensation filter 30 and the intermediate layer 20.

Figure 10:
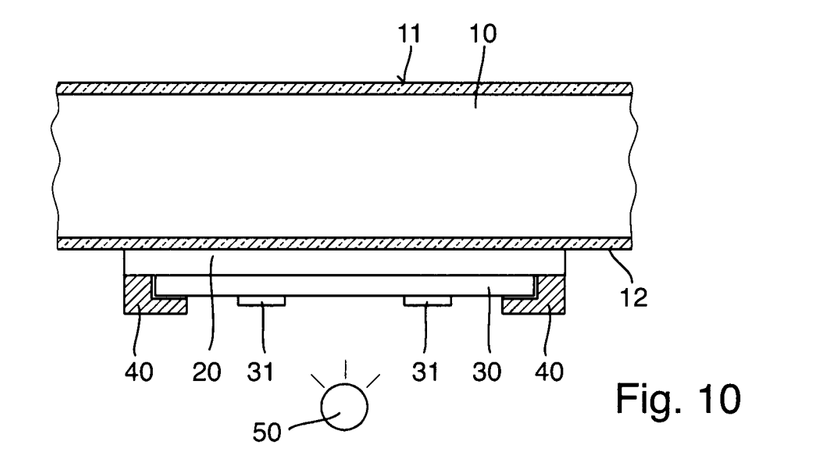
FIG. 10 illustrates a variant of the glass ceramic product of FIG. 8.

The example of embodiment according to FIG. 10 illustrates an enhancement of the example of embodiment according to FIG. 8. Accordingly, strip-shaped retaining elements 50 or retaining element 50 in the shape of a frame, which is (are) fastened, for example, glued, to the intermediate layer 20, are used. The retaining elements 50 form guides, into which the flat-surface color compensation filter 30 can be moved on the front side. Thus, it is possible, for example, to replace the color compensation filter 30 or to perform a customization by replacing the color compensation filter 30.

Figure 11:
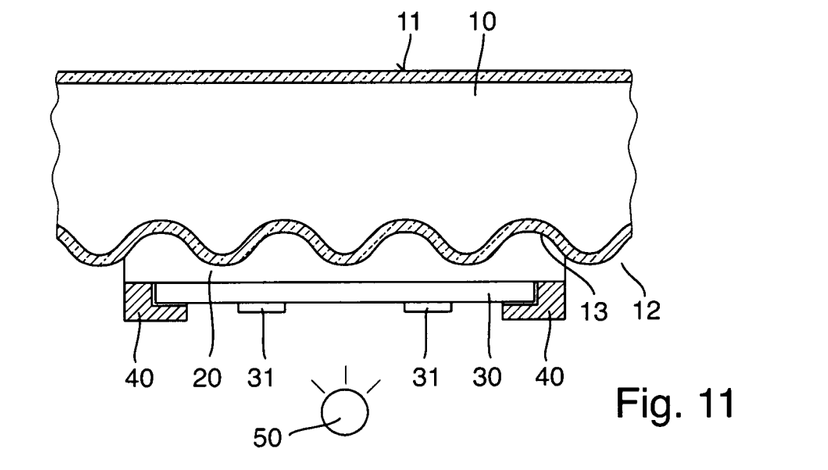
FIG. 11 illustrates another glass ceramic product.

In the example of embodiment according to FIG. 11, glass ceramics 10 with a knobby bottom are again employed. Here, the intermediate layer 20 again takes on the function of equilibrating the geometrical unevenness of the bottom of the glass ceramics. Similar to the example of embodiment according to FIG. 10, retaining elements 50 that hold the color compensation filter 30 are again used.

The color compensation filter 30 in all examples of embodiment may be a glass panel or a plastic panel, in particular, a plastic foil or film. In this case, this component may be colored or may be provided with a coating in the desired compensation color. It is conceivable that the color compensation filter 30 is prefabricated with an adhesive surface on its side facing the glass ceramics 10, so that it can be adhered directly. A simple manufacturing process is produced thereby.

The invention claimed is:

1. A cooktop display device comprising:
    a transparent, colored glass-ceramic product forming a cooking surface, the glass-ceramic product having a display face on a front and an illumination face on a back;
    at least one light-emitting element disposed in the region of the illumination face;
    a color compensation filter disposed between the glass-ceramic product and the at least one light-emitting element; and
    an at least partially transparent intermediate layer disposed between the color compensation filter and the glass-ceramic product.

2. The display device according to claim 1, wherein the at least partially transparent intermediate layer joins the color compensation filter directly or indirectly to the glass-ceramic product.

3. The display device according to claim 2, wherein the at least partially transparent intermediate layer is a transparent adhesive or a colored adhesive.

4. The display device according to claim 1, wherein the at least partially transparent intermediate layer comprises an adhesive layer.

5. The display device according to claim 4, wherein the adhesive layer faces at least one of the glass-ceramic product and the color compensation filter.

6. The display device according to claim 4, wherein the at least partially transparent intermediate layer is an adhesive tape.

7. The display device according to claim 1, wherein the glass-ceramic product further comprises texturing in a region of the illumination face, the at least partially transparent intermediate layer being applied on the texturing.

8. The display device according to claim 1, wherein the at least partially transparent intermediate layer has or is composed of a material selected from the group consisting of a silicone material, an acrylate material, a polyurethane resin material, an epoxy material, a rubber material, a polyamide material, a polyimide material, and combinations thereof.

9. The display device according to claim 1, wherein the glass-ceramic product has a refractive index that deviates from a refractive index of the at least partially transparent intermediate by a maximum of 20%.

10. The display device according to claim 1, further comprising one or more layer elements, the one or more layer elements being on a location selected from the group consisting of the color compensation filter, the at least partially transparent intermediate, and combinations thereof.

11. The display device according to claim 1, wherein the color compensation filter is a flat-surface element selected from the group consisting of a foil, a film, a matte, and a panel, the flat-surface element being having a color layer.

12. The display device according to claim 1, wherein the glass-ceramic product has a smooth, non-textured surface in a region of the illumination face.

13. The display device according to claim 1, wherein the at least partially transparent intermediate layer is formed by individual partial layer elements.

14. The display device according to claim 1, further comprising one or more mounting or retaining parts in a region of the illumination face.

15. The display device according to claim 14, wherein the one or more mounting or retaining parts are in a location selected from the group consisting of on the at least partially transparent intermediate layer, on the color compensation filter, and on the glass-ceramic product.

16. The display device according to claim 14, wherein the mounting or retaining parts hold the color compensation filter.

17. The display device according to claim 14, wherein the mounting or retaining parts hold an electrical component selected from the group consisting of a light-emitting element, a printed circuit board, and a sensor.

18. The display device according to claim 1, further comprising a light-scattering panel formed by at least one of the at least partially transparent intermediate layer and the color compensation filter.

19. The display device according to claim 1, further comprising an element selected from the group consisting of an electrically conductive track, a switching element, an electrode, and a sensor.

20. The display device according to claim 19, wherein the element is provided in a position selected from the group consisting of on the color compensation filter, on the at least partially transparent intermediate layer, on an additional intermediate layer disposed between the at least one light-emitting element and the glass-ceramic product.

21. The display device according to claim 1, wherein the at least partially transparent intermediate layer is a colored layer having a thickness that fluctuates a maximum of 25% of the respective layer thickness.

22. The display device according to claim 1, wherein the color compensation filter has a thickness that fluctuates a maximum of 25% of the respective layer thickness.

23. A display device comprising:
a transparent, colored glass-ceramic product having a display face on a front and an illumination face on a back, the glass-ceramic product further comprises texturing in a region of the illumination face;
at least one light-emitting element disposed in the region of the illumination face;
an at least partially transparent intermediate layer on the texturing to form a planar surface; and
a color compensation filter disposed on the planar surface between the glass-ceramic product and the at least one light-emitting element.

24. A display device comprising:
a transparent, colored glass-ceramic product having a display face on a front and an illumination face on a back;
at least one light-emitting element disposed in the region of the illumination face;
a color compensation filter disposed between the glass-ceramic product and the at least one light-emitting element;
an at least partially transparent intermediate layer disposed between the color compensation filter and the glass-ceramic product; and
an element selected from the group consisting of an electrically conductive track, a switching element, an electrode, and a sensor, wherein the element is provided in a position selected from the group consisting of on the filter, on the intermediate layer, on an additional intermediate layer disposed between the light-emitting element and the glass-ceramic product.

* * * * *